US012594723B2

(12) United States Patent
Han et al.

(10) Patent No.: US 12,594,723 B2
(45) Date of Patent: Apr. 7, 2026

(54) POWDER DISTRIBUTION DEVICE AND 3D PRINTING DEVICE INCLUDING SAME

(71) Applicant: SAMYOUNG MACHINERY CO., LTD., Gongju-si (KR)

(72) Inventors: Kuk Hyun Han, Daejeon (KR); Yong Sun Choi, Sejong-si (KR)

(73) Assignee: SAMYOUNG MACHINERY CO., LTD., Gongju-si (KR)

( * ) Notice: Subject to any disclaimer, the term of this patent is extended or adjusted under 35 U.S.C. 154(b) by 601 days.

(21) Appl. No.: 17/758,292

(22) PCT Filed: Dec. 30, 2020

(86) PCT No.: PCT/KR2020/019365
§ 371 (c)(1),
(2) Date: Jun. 30, 2022

(87) PCT Pub. No.: WO2021/137605
PCT Pub. Date: Jul. 8, 2021

(65) Prior Publication Data
US 2023/0044325 A1 Feb. 9, 2023

(30) Foreign Application Priority Data
Dec. 30, 2019 (KR) ........................ 10-2019-0178722

(51) Int. Cl.
*B29C 64/329* (2017.01)
*B22F 12/52* (2021.01)
(Continued)

(52) U.S. Cl.
CPC ............ *B29C 64/329* (2017.08); *B22F 12/52* (2021.01); *B29C 64/205* (2017.08); *B29C 64/321* (2017.08); *B33Y 30/00* (2014.12)

(58) Field of Classification Search
CPC ... B29C 64/205; B29C 64/255; B29C 64/321; B29C 64/329; B22F 12/52; B33Y 30/00; B65D 88/26
See application file for complete search history.

(56) References Cited

U.S. PATENT DOCUMENTS

| | | | | |
|---|---|---|---|---|
| 4,813,818 A | * | 3/1989 | Sanzone | B22F 3/004 |
| | | | | 406/122 |
| 2020/0147884 A1 | * | 5/2020 | Flick | B29C 64/209 |

FOREIGN PATENT DOCUMENTS

| | | | | |
|---|---|---|---|---|
| CN | 106113511 A | * | 11/2016 | B33Y 30/00 |
| CN | 110614366 A | | 12/2019 | |

(Continued)

OTHER PUBLICATIONS

ISA Korean Intellectual Property Office, International Search Report Issued in Application No. PCT/KR2020/019365, Apr. 13, 2021, WIPO, 4 pages.

*Primary Examiner* — Jerzi H Moreno Hernandez
(74) *Attorney, Agent, or Firm* — McCoy Russell LLP

(57) ABSTRACT

The present invention relates to a powder distribution device that can uniformly distribute powder using powder flow due to the weight of the powder itself, and a 3D printing device including the same. The powder distribution device of the present invention comprises a powder distribution unit that includes: an outer frame having an empty powder material inlet port; and at least one distribution plate disposed inside the outer frame to disperse introduced powder, wherein the powder can be broken down using the powder flow without additional power from a feed screw, a motor, or the like.

6 Claims, 14 Drawing Sheets

(51) Int. Cl.
B29C 64/205 (2017.01)
B29C 64/321 (2017.01)
B33Y 30/00 (2015.01)

(56) References Cited

FOREIGN PATENT DOCUMENTS

| | | | | |
|---|---|---|---|---|
| DE | 102017213087 | A1 | | 1/2019 |
| JP | H06191615 | A | | 7/1994 |
| JP | H071799 | U | | 1/1995 |
| JP | 2018070202 | A | * | 5/2018 |
| JP | 6448004 | B2 | * | 1/2019 ............... B22C 9/02 |
| KR | 20160040846 | A | * | 4/2016 |

* cited by examiner

100

200

210                    220

POWDER DISTRIBUTION DEVICE AND 3D PRINTING DEVICE INCLUDING SAME

CROSS REFERENCE TO RELATED APPLICATIONS

The present application is a U.S. National Phase of International Application No. PCT/KR2020/019365 entitled "POWDER DISTRIBUTION DEVICE AND 3D PRINTING DEVICE INCLUDING SAME," and filed on Dec. 30, 2020. International Application No. PCT/KR2020/019365 claims priority to Korean Patent Application No. 10-2019-0178722 filed on Dec. 30, 2019. The entire contents of each of the above-listed applications are hereby incorporated by reference for all purposes.

TECHNICAL FIELD

The present invention relates to a powder distribution device and a 3D printing device including the same, and more particularly, to a powder distribution device capable of uniformly distributing powder using powder flow by self-loading and a 3D printing device including the same.

BACKGROUND AND SUMMARY 3D printing refers to an operation of three-dimensionalizing electronic information for realizing a three-dimensional (3D) shape through an automated output device, and a device that performs such 3D printing is called a 3D printing device. There are various 3D printing methods, but among them, 3D printing using powder has the following stages. First, in order to print a product with fine powder, the powder is applied to have a certain laminating height and thickness over the entire surface of a work box, and a binder is selectively sprayed onto a predetermined desired region of the powder laminated in an unsolidified state or the predetermined desired region of the powder is selectively irradiated by a laser to solidify the powder in the corresponding region. The process of application and solidification is performed in one application layer, and the product to be manufactured is divided into several layers, the powder application and selective solidification are repeated for each layer to create a desired shape, and finally, a solidified product surrounded with the unsolidified powder is extracted, thereby completing the product.

In order to manufacture a single or a plurality of products through such a method, a material should be applied flatly on a stage in the application stage, and to this end, a coating device called a recoater is usually used. FIG. 1 shows an example of a recoater of a related art for powder application, which includes equipment such as a roller 2 or a feed screw for distributing powder inside the recoater 1 and a motor (not shown) for rotating the same, and as a result, the volume and weight of the recoater 1 increase and additional costs are required for transporting and controlling the recoater 1.

Accordingly, there is a need for a method that may easily control the transfer of the recoater and reduce costs by uniformly distributing powder in a recoater without additional devices such as a feed screw or a motor.

DISCLOSURE

Technical Problem

An object of the present invention is to provide a powder distribution device capable of distributing powder using a flow of powder without additional power such as a feed screw and a motor.

Another object of the present invention is to provide a powder distribution device capable of obtaining a desired distributing aspect by adjusting a position and angle of a distribution plate and a hole size of the distribution plate.

Technical Solution

In one general aspect, a powder distribution device includes a powder distribution unit including an outer frame having a powder material inlet port and at least one distribution plate disposed in the outer frame and distributing introduced powder, wherein the distribution plate may have an inclined surface for guiding powder discharged through a powder discharge surface to fall to a lower side of both side surfaces and may be controlled to have various distribution aspects according to a shape and a disposition of the distribution plate and a pattern of a through-hole or a through-opening formed at the inclined surface of the distribution plate.

Advantageous Effects

Through such a configuration, the powder distribution device of the present invention may distribute powder to a plurality of plates having a special shape, instead of a motor and a screw, thereby obtaining effects such as weight reduction, low costs, and ease of replacement.

BRIEF DESCRIPTION OF THE DRAWINGS

FIGS. 11A to 14 are views showing another exemplary embodiment of the powder distribution device of the present invention.

BEST MODE

Figure 1:
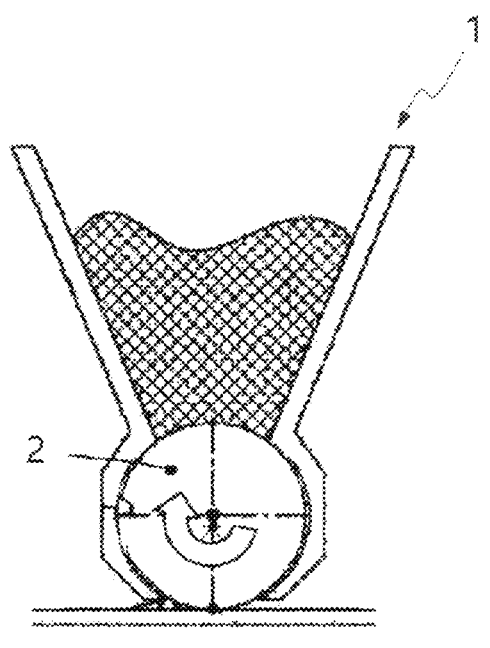
FIG. 1 is a cross-sectional view of a recoater in which a powder distribution device or the related art is formed inside the recoater.

A powder distribution device of the present invention for achieving the above object includes an outer frame having a powder material inlet port and a powder distribution unit having at least one distribution plate disposed in the outer frame and distributing introduced powder, wherein the distribution plate is disposed to be spaced apart by a predetermined interval from a powder discharge surface from which powder is discharged, and has an inclined surface guiding powder discharged through the powder discharge surface to fall to a lower side of both side surfaces.

In addition, the inclined surface of the distribution plate includes one or more through-holes formed so that powder may fall to a lower side through the distribution plate.

In addition, a center line of the through-hole formed on the inclined surface of the distribution plate is disposed to be perpendicular to the inclined surface or disposed to be parallel to a center line of the powder material inlet port.

In addition, a falling position of powder is adjusted by adjusting an angle between the central line of the through-hole formed in the inclined surface of the distribution plate and the central line of the powder material inlet port.

In addition, the through-hole formed in the inclined surface of the distribution plate gradually increases downwardly.

In addition, the through-hole formed in the inclined surface of the distribution plate has a circular, elliptical, or polygonal shape.

In addition, the distribution plate may include: a first distribution plate disposed below the material inlet port; and a second distribution plate disposed to be spaced apart from the first distribution plate by a predetermined interval below both end portions of the first distribution plate.

In addition, the distribution plates are disposed in a plurality of stages below the material inlet port, and the number of the distribution plates increases downwardly.

In addition, a plurality of through-holes are formed in the distribution plates disposed in the plurality of stages, and a powder distribution point may be controlled by adjusting a formation position, diameter, or angle of the through-holes.

In addition, an angle formed by the inclined surfaces of both sides of the distribution plate is greater than an angle formed by the inclined surfaces of both sides of the outer frame.

In addition, a distance by which the distribution plate is spaced apart from the powder discharge surface from which powder is discharged is ½ or greater of a height of the outer frame.

In addition, the inclined surface of the distribution plate has one or more through-holes formed so that powder may pass through the distribution plate and fall downwardly, and a distance between an end of the inclined surface of the distribution plate and the outer frame is smaller than or equal to a diameter of a through-hole disposed at the lowermost end among a plurality of through-holes formed in the inclined surface.

In addition, a powder distribution device of the present invention includes an outer frame having a powder material inlet port, and a powder distribution unit having at least one distribution plate disposed inside the outer frame and distributing the introduced powder, wherein the distribution plate has an inclined surface branching from a powder discharge surface to both sides to distribute powder discharged through a powder discharge surface, and a powder discharge hole formed between the outer frame and the inclined surface of the distribution plate and between the inclined surfaces of both sides of the distribution plate.

In addition, the distribution plate is detachably coupled to the outer frame.

In addition, at least one surface of the outer frame is formed of a transparent material, so that a distribution form of powder may be checked from the outside.

As another example, a powder distribution device of the present invention includes a hopper temporarily accommodating supplied powder; an opening and closing unit disposed below the hopper and controlling an introduction of powder; and a powder distribution unit having an outer frame having a powder material inlet port formed below the opening and closing unit and at least one distribution plate disposed inside the outer frame and distributing introduced powder.

Meanwhile, a 3D printing device including a powder distribution device of the present invention includes a build plate movable in a vertical direction, metal or non-metal powder being solidified and laminated in the build plate; a recoating device applying powder on the build plate, and the powder distribution device described above supplying powder to the recoating device.

In addition, the recoating device includes an application unit temporarily receiving the powder supplied through the powder distribution device and applying the powder to the build plate, and a blade for flattening the powder applied to the build plate by the application unit.

MODE FOR INVENTION

Specific exemplary embodiments and features of the present invention will be described in detail with reference to the accompanying drawings. However, the present invention may be modified in many different forms and it should not be limited to exemplary embodiments set forth herein. These exemplary embodiments may be provided so that this disclosure will be thorough and complete, and will fully convey the scope of the invention to those skilled in the art. Like reference numerals denote like elements throughout the description.

In the following description, when a detailed description of the relevant known function or configuration is determined to unnecessarily obscure the gist of the present disclosure, the detailed description will be omitted. The terms used henceforth are defined in consideration of the functions of the present disclosure, and may be altered according to the intent of a user or operator, or conventional practice. Therefore, the terms should be defined on the basis of the entire content of this specification.

Hereinafter, a powder distribution device according to the present invention and a 3D printing device including the same will be described in detail with reference to the accompanying drawings.

Figure 2:
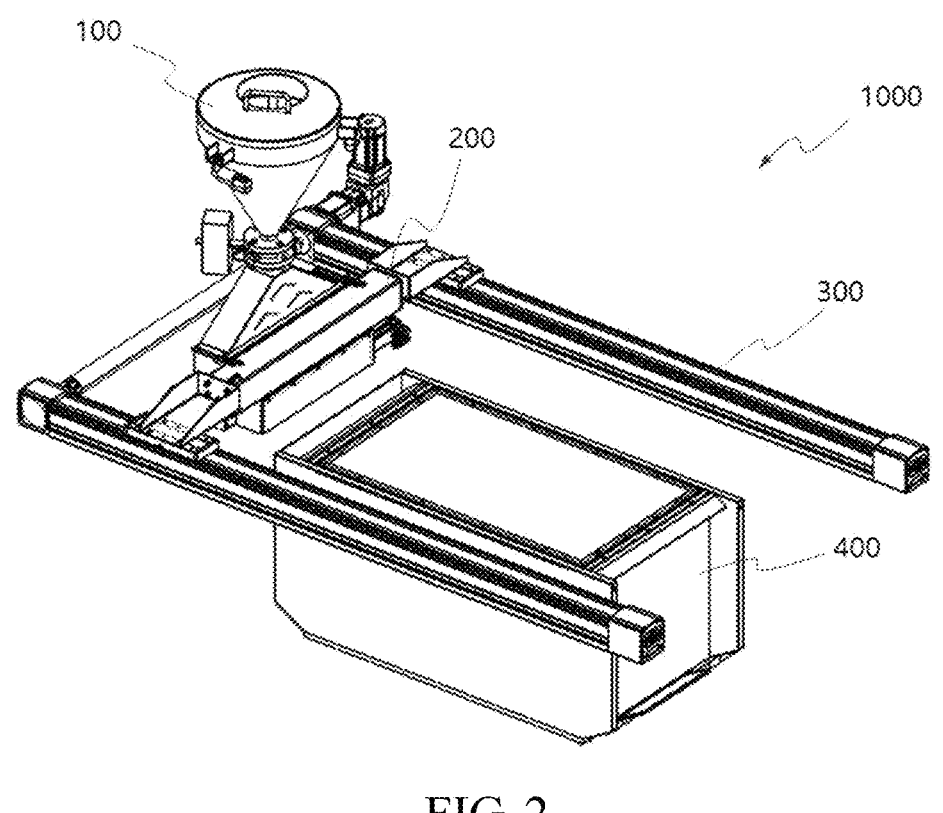
FIG. 2 is a perspective view of a 3D printing device including a powder distribution device of the present invention.
Figure 3:
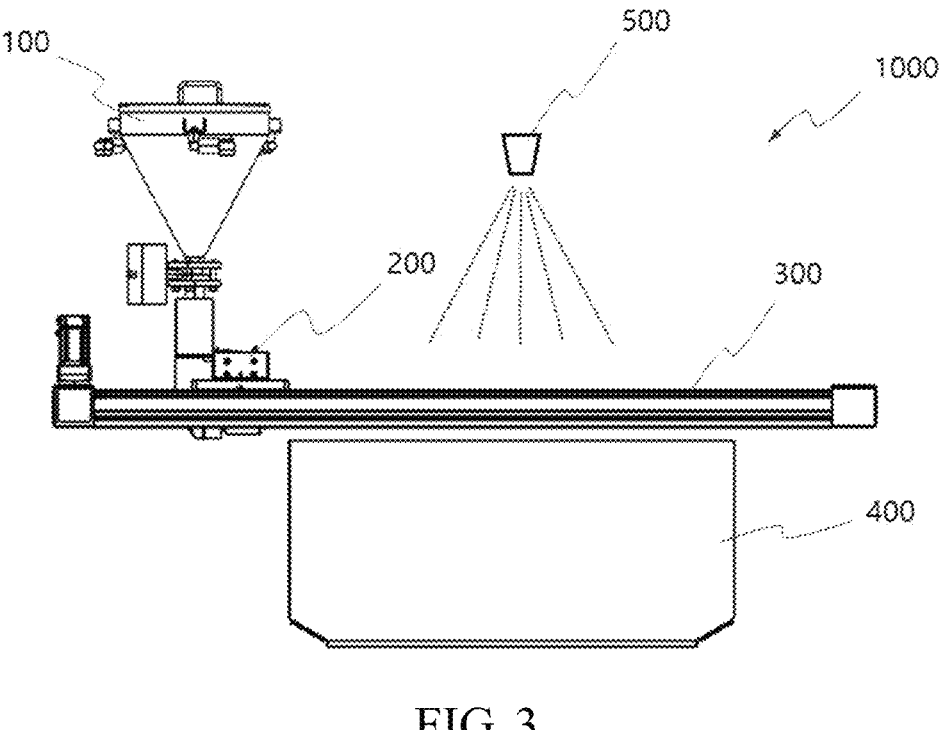
FIG. 3 is a front view of a 3D printing device including a powder distribution device of the present invention.

FIGS. 2 and 3 are a perspective view and a front view of a 3D printing device 1000 including a powder distribution device 100 of the present invention. Referring to FIGS. 2 and 3, the 3D printing device 1000 of the present invention includes the powder distribution device 100 for supplying and distributing powder for laminating and manufacturing, a recoating device 200 for applying powder on a build plate 400, a transfer device 300 for reciprocating the recoating device 200 on the build plate 400, the build plate 400 movable in a vertical direction, in which metal or non-metal powder is solidified and laminated, and a laser irradiating unit 500 irradiating the powder applied to the build plate 400 with a laser to selectively solidify the powder or a binder spraying unit 500 spraying a binder.

Figure 4:
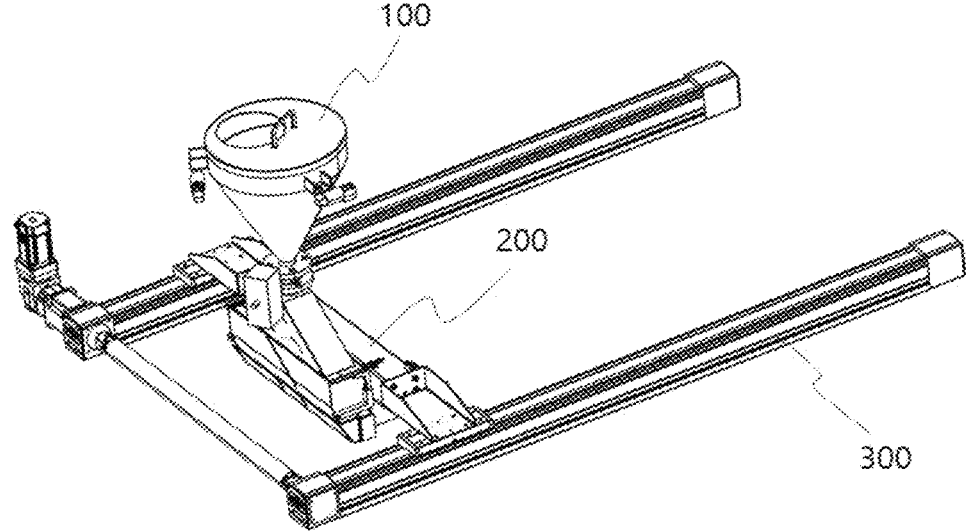
FIG. 4 is a perspective view of a powder distribution device and a coating device of the present invention.
Figure 5:
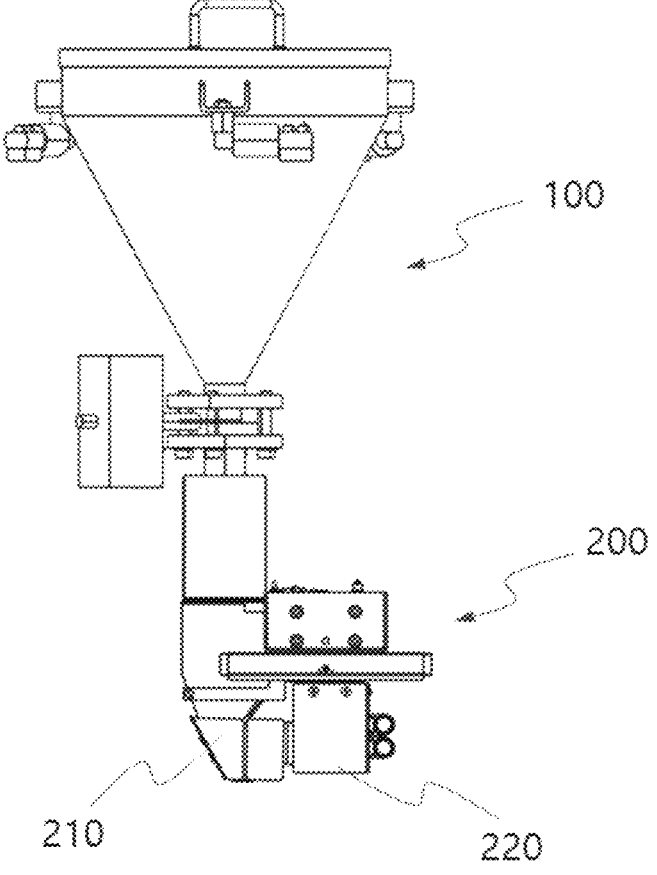
FIG. 5 is a front view of a powder distribution device and a recoating device of the present invention.

FIGS. 4 and 5 are perspective and front views of the powder distribution device 100 and the recoating device 200 of the present invention. Referring to FIGS. 4 and 5, the recoating device 200 of the present invention applies powder on the build plate 400, while reciprocating on the build plate 400 along the transfer device 300 and flattens the applied powder. In the related art, in order to distribute powder on the build plate 400, a method of installing a feed screw inside the recoating device 200 and rotating the feed screw through a motor was used, but this method increases the volume and weight of the recoating device 200 and incurs additional costs. In order to solve this problem, in the present invention, the powder distribution device 100 for distributing powder is separately installed at an upper portion of the recoating device 200 as shown in FIG. 5 to evenly distribute the powder to the recoating device 200. The recoating device 200 includes an application unit 210 applying the powder supplied from the powder distribution device 100 on the build plate 400 and a blade 220 for flattening the applied powder.

Figure 6:
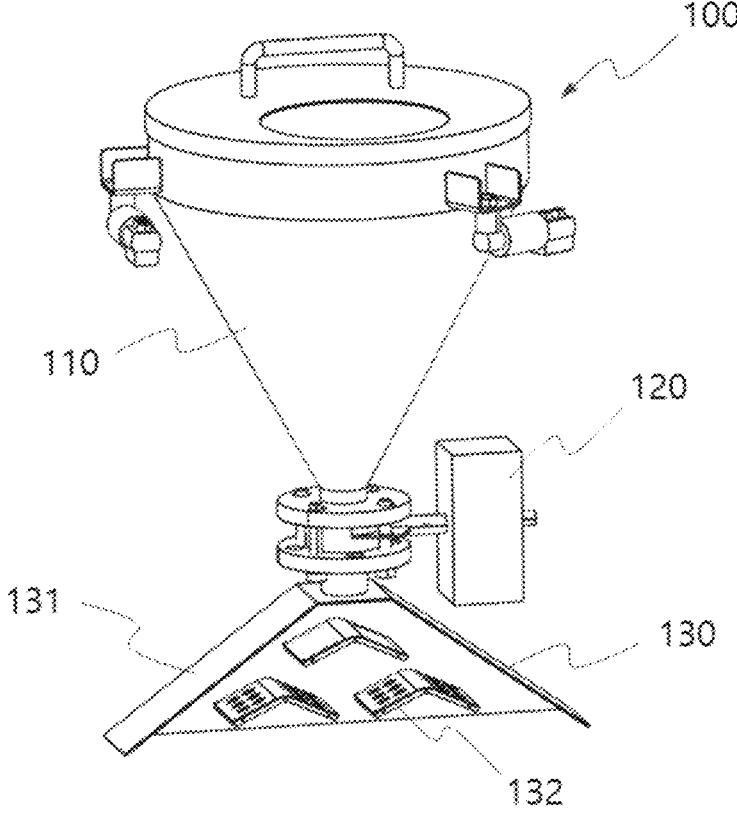
FIG. 6 is a perspective view of a powder distribution device of the present invention.

FIG. 6 is a perspective view of the powder distribution device 100 of the present invention. Referring to FIG. 6, the powder distribution device 100 of the present invention includes a hopper 110 temporarily accommodating powder supplied from the outside, an opening and closing unit 120 disposed below the hopper 110 and controlling the introduction of powder, and a powder distribution unit 130 including an outer frame 131 having a powder material inlet port formed below the opening and closing unit 120 and at least one distribution plate 132 disposed inside the outer frame 131 and distributing the introduced powder.

The hopper 110 is formed to have a cross-section narrowing downwardly to temporarily store the powder material put in an upper portion thereof, and when it is necessary to supply powder, the powder is discharged through the opening and closing unit 120 connected to a lower portion of the hopper 110. The powder distribution unit 130 of the present invention includes the outer frame 131 fixing the distribution plate 132, preventing the powder from spreading to the outside, and preventing external impurities or foreign substances from being introduced and the distribution plate 132 disposed inside the outer frame 131 and distributing the introduced powder.

The distribution plate 132 of the present invention is formed to have an inclined surface 133 for guiding the powder introduced through the powder material inlet port to fall downwardly, and the powder falling from an upper portion is distributed by self-loading of the powder, while moving along the inclined surface 133 formed on one side or both sides. At this time, the distribution plate 132 includes one or multiple N stages, and the powder is distributed and supplied into the recoating device 200 due to the structure of the distribution plate, and a powder distribution aspect may be controlled to a desired form according to a shape, position, angle, etc. of the through-hole 134 formed in the distribution plate 132.

Figure 7:
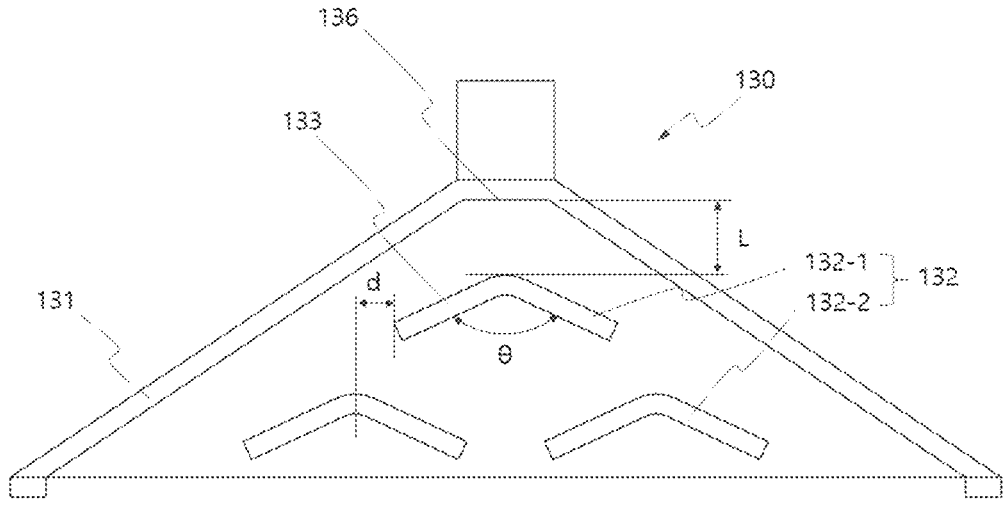
FIG. 7 is a front view showing a powder distribution unit of a powder distribution device of the present invention.

FIG. 7 is a front view showing the powder distribution unit 130 of the powder distribution device 100 of the present invention. Referring to FIG. 7, the distribution plate 132 of the present invention has the inclined surface 133 for guiding powder introduced through the powder material inlet port to fall to both sides downwardly. At this time, the distribution plate 132 is disposed to be spaced apart from the powder discharge surface 136 from which the powder is discharged, and after the powder is discharged, the powder falls down by gravity and collides with the distribution plate 132 to be evenly distributed. In addition, the distribution plate 132 includes a first distribution plate 132-1 spaced apart from the lower powder discharge surface 136 of the material inlet port by a predetermined interval and inclined to both sides and a second distribution plate 132-2 disposed to be spaced apart below end portions of both sides of the first distribution plate 132-1. Through this, the powder falling from the material inlet port collides with the first distribution plate 132-1 and then is lowered along the inclined surface 133 of the first distribution plate 132-1, and the powder falling from an end portion of the first distribution plate 132-1 collides with the second distribution plate 132-2 and then is lowered along the inclined surface 133 of the second distribution plate 132-2. As described above, the powder is evenly distributed and supplied by colliding with the distribution plate while descending along the multi-stage inclined surface 133. By adjusting the angle θ of the distribution plate 132 and the distance d from the end portion of the distribution plate 132 to the top of the distribution plate 132 in the next stage, the degree of distribution or the supply position of the powder may be determined.

The angle θ of the distribution plate 132 is a factor that affects the amount of powder being discharged. As the angle θ of the distribution plate 132 is decreased, friction with the surface is reduced to make the discharge space of the powder fast and a speed of the powder in a horizontal direction is reduced to reduce a force for spreading the powder. According to the angle θ of the distribution plate 132 of each stage, a position of the distribution plate 132 of the next stage should be changed.

The distance d from the end portion of the distribution plate 132 to the top of the next stage distribution plate 132 is a factor that determines the amount of powder distributed on both sides based on the center of the distribution plate 132. Since the powder transferred in the previous stage freely falls with the speed in the horizontal direction, the horizontal distance d should be set in consideration of this.

Although the drawings illustrate that inclined surfaces are formed on both sides of the distribution plate, if necessary, powder may be supplied from one side and the inclined surface may be formed only on one side of the distribution plate. In addition, distribution or a distribution position of the powder may be determined by varying the inclination angles and lengths of the inclined surfaces on both sides.

Figures 8A, 8B, 8C:
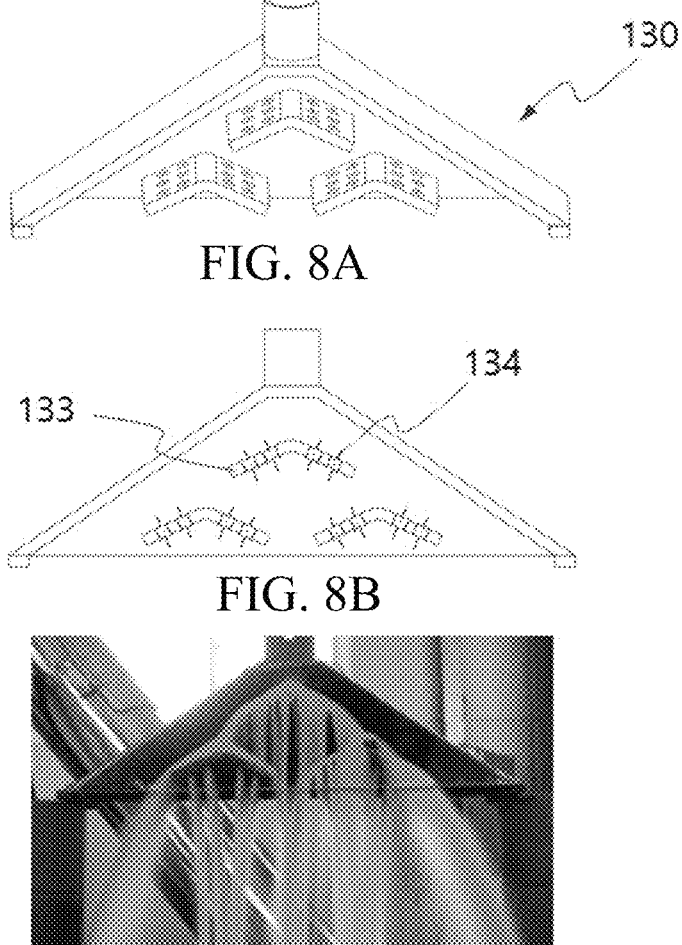
FIGS. 8A-8C are views showing exemplary embodiments of powder distribution devices of the present invention.

FIGS. 8A-8C are views showing an exemplary embodiment of the powder distribution device 100 of the present invention. Referring to FIG. 8B, the inclined surface 133 of the distribution plate 132 may have one or more through-holes 134 allowing powder to fall downwardly through the distribution plate 132. At this time, when a center line of the through-hole 134 formed in the inclined surface 133 of the rear plate is vertically disposed with respect to the inclined surface 133 as shown in FIG. 8B, powder moved along the inclined surface 133 may fall along the center line of the through-hole 134 and the powder is sprayed into the inclined surface 133 as shown in FIG. 8C. When at least one surface of the outer frame 131 of the present invention is formed of a transparent material, a distribution form of the powder may be identified from the outside.

Figure 9A:
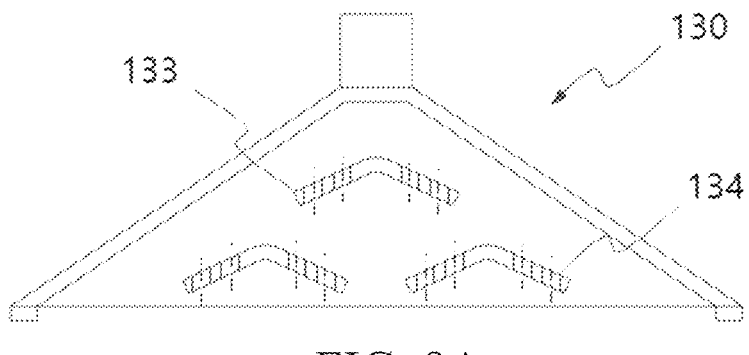
FIGS. 9A-9B are views showing modified examples of an exemplary embodiment of powder distribution devices of the present invention.
Figure 9B:
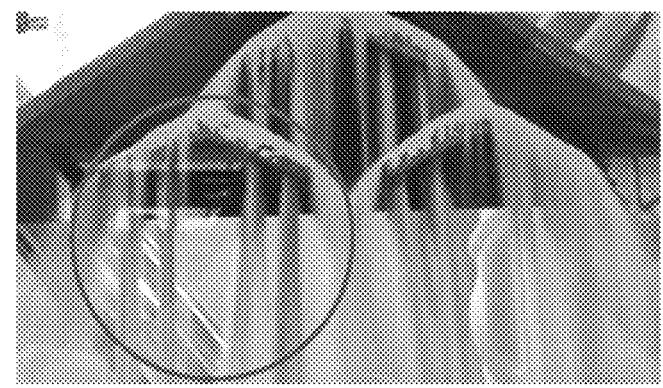

FIGS. 9A-9B are views showing a modified example of an exemplary embodiment of the powder distribution device 100 of the present invention, illustrating an example in which the center line of the through-hole 134 formed in the inclined surface 133 of the distribution plate 132 is parallel to the center line of the powder material inlet port. In this case, the powder is sprayed in a vertical direction as shown in FIG. 9B. In another exemplary embodiment, a machining axis of the through-hole 134 may be arbitrarily set, and the machining axis of the through-hole 134 may be disposed inward (the angle between the axes is acute) or outward (the angle between the axes is an obtuse angle), so that powder may be distributed to a portion required to be supplied.

Figure 10:
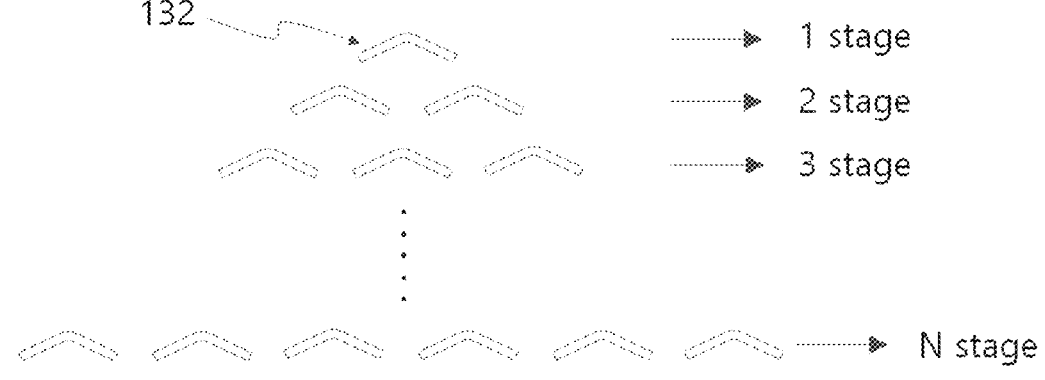
FIG. 10 is a conceptual diagram illustrating the distribution plate arrangement of the present invention.

FIG. 10 is a conceptual diagram illustrating an arrangement of the distribution plates 132 of the present invention, and, as described above, the powder distribution device 100 of the present invention includes one or a plurality of distribution plate 132 having the inclined surface 133 having a predetermined shape, and when the powder distribution device 100 includes a plurality of distribution plates 132, the distribution plates 132 may be arranged in several stages from the top to the bottom. Depending on the angle of the distribution plate 132 of each stage, the installation position, the pattern of the through-hole 134, etc., it is possible to control the discharge amount of powder, the discharge pattern, and the shape, and as the number of stages increases, the resolution of material distribution increases. The distribution plate 132 of the present invention is detachably coupled to the outer frame 131, and thus, equipment may be economically configured by designing the number of stages according to a desired powder supply type.

Figures 11A, 11B:
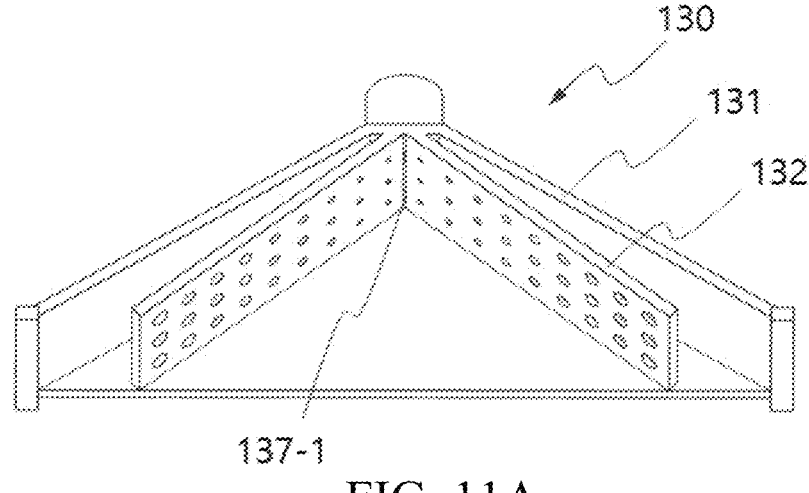
Figure 12A:
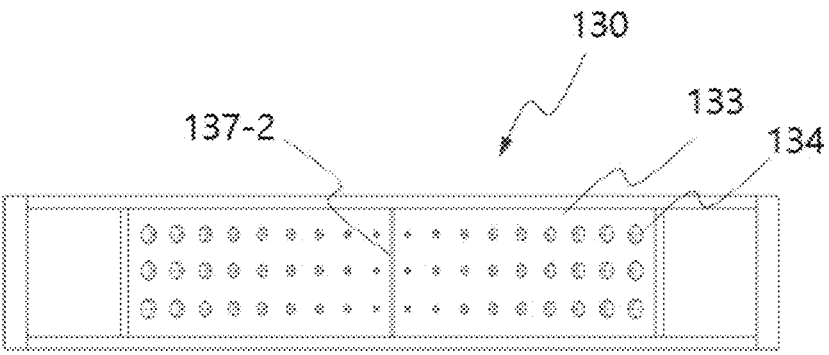
Figure 12B:
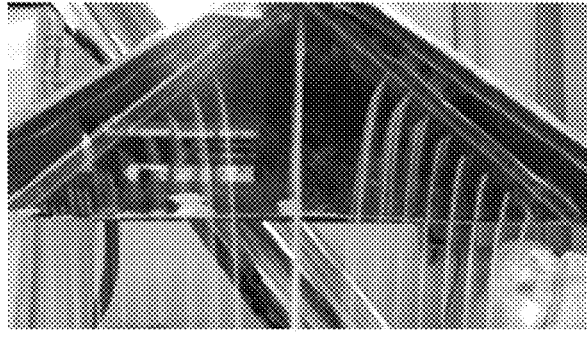

FIGS. 11A to 13C are views showing another exemplary embodiment of the powder distribution device 100 of the present invention. Referring to FIGS. 11A-11B, the distribution plate 132 has the inclined surface 133 branched to both sides from the powder discharge surface 136 to distribute the powder discharged through the powder distributing surface, and a powder discharge hole 137 is formed between the outer frame 131 and the inclined surface 133 of the distribution plate 132 and between the inclined surfaces of both sides of the powder distribution unit. That is, a central powder discharge hole 173-1 may be formed between the both inclined surfaces 133 of the powder distribution unit, and side powder discharge holes 137-2 and 137-3 may be formed between the outer frame 131 and the inclined surface 133 of the distribution plate 132, so that the powder passing through the powder discharge surface 136 may be discharged in three directions. At this time, the hole formed in the inclined surface 133 of the distribution plate 132 is formed to have a diameter gradually increasing downwardly. As the powder introduced from the inlet port is distributed downwardly, the residual amount is gradually reduced, so that the amount of distribution may be uniformly controlled by increasing the size of the through-hole 134 from the upper powder inlet port to a lower outlet.

Figures 13A, 13B, 13C:
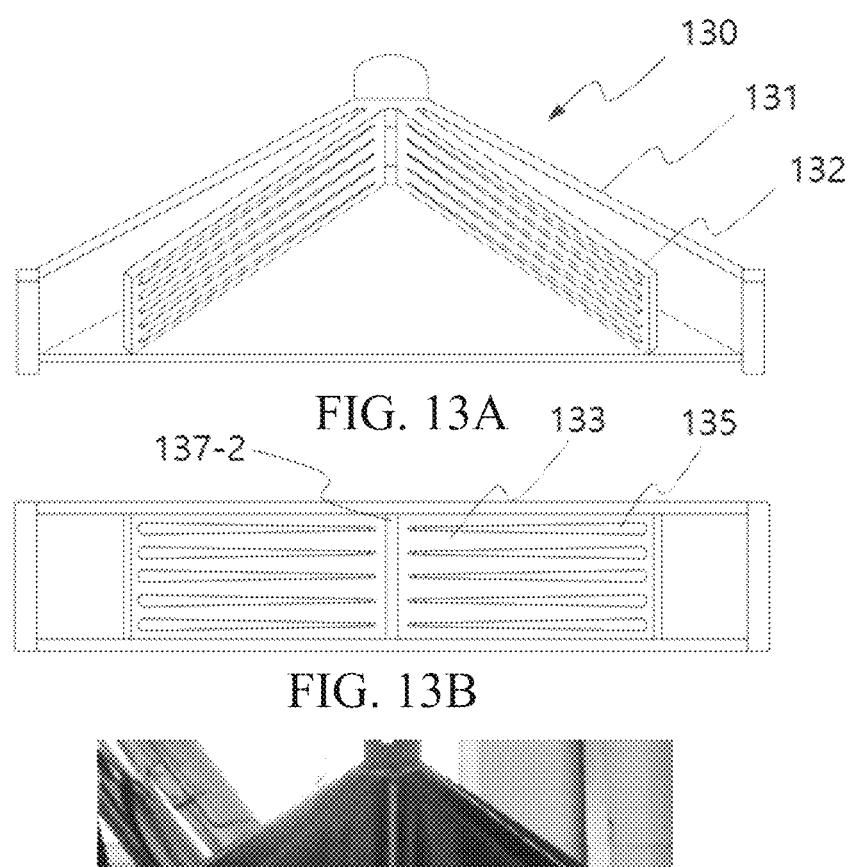

Meanwhile, the hole formed in the inclined surface 133 of the distribution plate 132 may have a circular, oval, or polygonal shape. Referring to FIGS. 13A-13C showing another exemplary embodiment of the powder distribution device 100 of the present invention, through-openings 135 having a width increasing downwardly are formed to be parallel to each other in the inclined surface 133 of the distribution plate 132. Also at this time, as the width of the through-opening 135 increases downwardly, a uniform distribution amount may be secured even when the distribution amount is reduced.

Powder may be controlled to have various distribution patterns according to the pattern of the through-holes 134 or the through-openings 135, and since the material supplied from the hopper 110 is transferred by self-loading without external force, the supply amount and the material inflow rate may be maintained constantly. In addition, a desired amount of material may be supplied to a desired portion by using a difference in distribution speed depending on the pattern, shape, and region of the through-hole 134.

Figure 14:
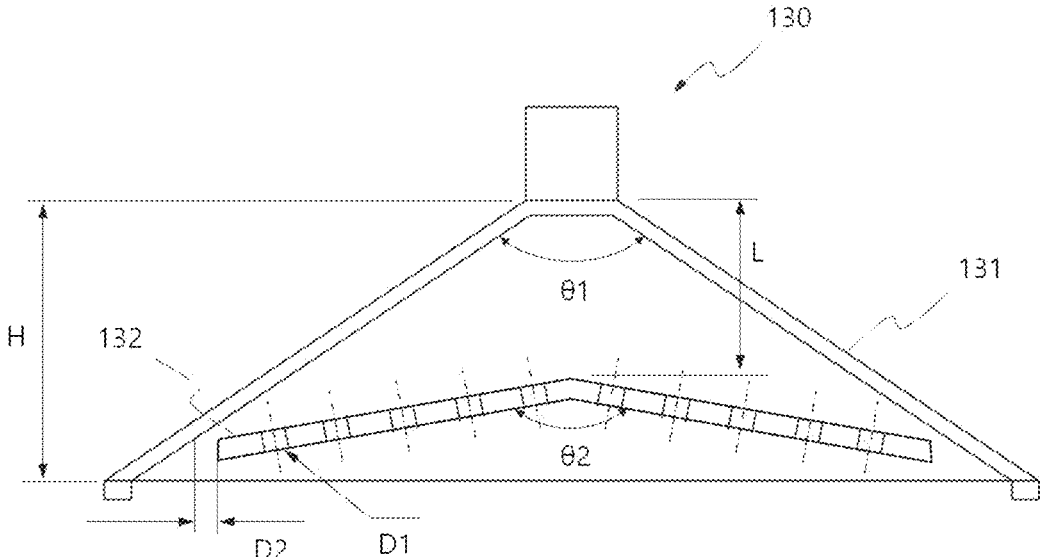

As another exemplary embodiment, referring to FIG. 14, the angle formed by the inclined surfaces 133 on both sides of the distribution plate 132 is greater than the angle formed by the inclined surfaces on both sides of the outer frame 131 and the distribution plate 132 is disposed to have a distance sufficiently spaced apart from the powder discharge surface 136 from which powder is discharged, so that the powder may collide with the inclined surface 133 of the distribution plate 132 with a sufficient momentum and then discharged downwardly through the through-hole 134 formed in the inclined surface 133. In this case, it is more preferable that the distance by which the distribution plate 132 is spaced apart from the powder discharge surface 136 from which powder is discharged may be at least ½ of the height of the outer frame 131.

Meanwhile, by narrowing the distance between the end of the inclined surface 133 of the distribution plate 132 and the outer frame 131 as much as possible, a large amount of powder may be prevented from being unnecessarily discharged to the side. Preferably, the distance between the end of the inclined surface 133 of the distribution plate 132 and the outer frame 131 may be smaller than or equal to the diameter of the through-hole disposed at the lowermost end among the plurality of through-holes 134 formed in the inclined surface 133.

The present invention is not limited to the exemplary embodiments described above, and the scope of application is diverse in regions requiring distribution of materials other than the 3D printing device, and the present invention may be variously modified by a person skilled in the art to which the present invention pertains, without departing from the gist of the present invention.

INDUSTRIAL APPLICABILITY

Since the present invention relates to a 3D printing device, it has industrial applicability.

Detailed Description of Main Elements

1: recoater of related art
2: roller
1000: 3D printing device
100: powder distribution device
110: hopper
120: opening and closing unit
130: powder distribution unit
131: outer frame
132: distribution plate
132-1: first distribution plate
132-2: second distribution plate
133: inclined surface
134: through-hole
135: through-opening
136: powder discharge surface
137: powder discharge hole
137-1: central powder discharge hole
137-2, 137-3: side powder discharge hole
200: recoating device
210: application unit
220: blade
300: transfer device
400: build plate
500: laser irradiating unit, binder spraying unit

The invention claimed is:

1. A powder distribution device for supplying powder to a powder-based 3D printing device, the powder distribution device comprising:

a powder distribution unit including an outer frame having a powder material inlet port and a plurality of distribution plates disposed in the outer frame and distributing introduced powder, wherein the plurality of distribution plates include a first distribution plate disposed below the powder material inlet port, and a pair of second distribution plates respectively disposed below both ends of the first distribution plate, wherein each of the first distribution plate and the pair of second distribution plates are spaced apart by a predetermined interval from a powder discharge surface from which powder is discharged, and wherein each of the first distribution plate and the pair of second distribution plates has two inclined side surfaces that guide powder discharged from the powder discharge surface to fall to lower sides of the respective first distribution plate and pair of second distribution plates, wherein each inclined side surface of the first distribution plate and the pair of second distribution plates includes a plurality of through-holes formed so that the powder can fall through each of the first distribution plate and the pair of second distribution plates to a lower side, and a diameter of the plurality of through-holes gradually increases in a downward direction along the length of each of the inclined side surfaces, and wherein center portions of the pair of second distribution plates are spaced apart horizontally by a predetermined interval from the opposite ends of the first distribution plate, and wherein the center portions are positioned to distribute the powder falling from the first distribution plate.

2. The powder distribution device of claim 1, wherein a center line of each of the plurality of through-holes formed through the inclined surfaces of the first distribution plate and the pair of second distribution plates is disposed to be perpendicular to the respective inclined surface or disposed to be parallel to a center line of the powder material inlet port.

3. The powder distribution device of claim 1, wherein a falling position of powder is adjusted by adjusting an angle between a central line of the plurality of through-holes formed in the inclined surfaces of the first distribution plate and the pair of second distribution plates and a center line of the powder material inlet port.

4. The powder distribution device of claim 1, wherein the plurality of through-holes formed in the inclined surfaces of the first distribution plate and the pair of second distribution plates has a circular, elliptical, or polygonal shape.

5. The powder distribution device of claim 1, wherein the first distribution plate and the pair of second distribution plates are detachably coupled to the outer frame.

6. The powder distribution device of claim 1, wherein at least one surface of the outer frame is formed of a transparent material, so that a distribution form of powder may be checked from outside.

* * * * *